United States Patent [19]

Gijzen

[11] 4,376,572

[45] Mar. 15, 1983

[54] PIVOTING MIRROR DEVICE

[75] Inventor: Wilhelmus A. H. Gijzen, Eindhoven, Netherlands

[73] Assignee: U.S. Philips Corporation, New York, N.Y.

[21] Appl. No.: 229,419

[22] Filed: Jan. 29, 1981

[30] Foreign Application Priority Data

Oct. 30, 1980 [NL] Netherlands .................. 8005948

[51] Int. Cl.³ ............................................. G02B 27/17
[52] U.S. Cl. ....................................... 350/486; 369/44
[58] Field of Search ....................... 350/6.5, 6.6, 486; 369/44, 45

[56] References Cited

U.S. PATENT DOCUMENTS 4,021,096  5/1977  Dragt .............................. 350/486 X
4,129,930 12/1978  Dragt .............................. 350/486 X

*Primary Examiner*—F. L. Evans

*Attorney, Agent, or Firm*—Thomas A. Briody; Robert T. Mayer; Algy Tamoshunas

[57] ABSTRACT

Figure 1:
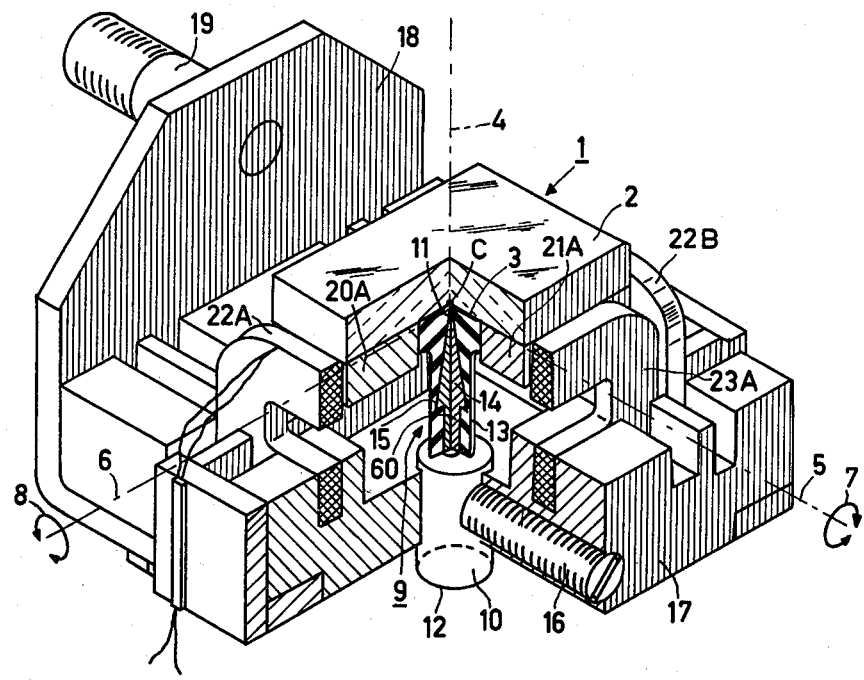

A pivoting mirror device for an apparatus for optically reading information tracks on an information carrier comprises a pivoting mirror (1) which is pivotable about one or more pivoting axes (5, 6) with the aid of a mirror bearing arrangement (9), which arrangement comprises a rigid bearing support (10) and an elastic bearing (13) made of a rubber-like material, which is connected both to the pivoting mirror and to the bearing support and which partly surrounds the bearing support. In order to obtain a suitable ratio between the rigidity of the pivoting mirror bearing in desired pivoting directions and the rigidity in undesired articulating directions, the portion (14) of the bearing support located in the elastic material has a cross-section which varies from a minimum transverse dimension at the end (11) of the bearing support near the pivoting mirror to a maximum transverse dimension at a location which is more remote from the pivoting mirror (15). (FIG. 1).

4 Claims, 4 Drawing Figures

PIVOTING MIRROR DEVICE

The invention relates to a pivoting device for an apparatus which scans information tracks on an information carrier with the aid of a radiation beam, which device comprises: a pivoting mirror which is pivotable about at least one pivoting axis and which has a radiation-reflecting front and, on the reverse side thereof, a back and a mirror bearing arrangement comprising a rigid bearing support having a first end which is situated near the back of the pivoting mirror and a second end which is remote therefrom, and an elastic bearing of a rubber-like material which is connected both to the back of the pivoting mirror and to the bearing support, which material surrounds the first end of the bearing support and a portion of the bearing support near the first end.

A pivoting mirror device of this type is known from U.S. Pat. No. 4,021,096. It is proposed to make the mirror bearing of this known pivoting mirror device from silicone rubber, liquid silicone rubber being applicable through an inlet duct in the rigid bearing support. The pivoting mirror and the bearing support are brought into a mutual spatial relationship which at least substantially corresponds to the spatial relationship that should exist in the finished mirror device, and a silicone rubber compound is applied through the inlet duct in a viscous mouldable condition in order to fill the space between the back of the pivoting mirror and the first end of the bearing support. Subsequently, the silicone rubber is allowed to cure. In view of the problems which occur during the manufacture of such pivoting mirror devices, especially the problems in handling the viscous silicone rubber compound and the long curing time which is required, U.S. Pat. No. 4,129,930 proposes to manufacture the elastic bearing initially as a finished part and to affix it to the pivoting mirror at a later stage. A suitable rubber-like material for a bearing manufactured in accordance with this method is for example chloroprene rubber. It is possible to interconnect the bearing support and the elastic bearing in a mould by means of a moulding method and during the manufacture of the elastic bearing. After the moulding operation the bearing support and the elastic bearing together constitute an easy-to-handle mounting unit.

One of the problems associated with pivoting mirror devices with elastic bearings is that in pivoting devices in which the pivoting mirror should be pivotable a high elasticity is required, but that in all other directions of movement the bearing should have a high rigidity. In the first-mentioned U.S. Pat. No. 4,021,096 a pivoting mirror device is described in which the bearing support is tubular and has an opening which faces the back of the pivoting mirror. The silicone rubber compound is not only located between the open end of the bearing support and the back of the pivoting mirror, but also partly surrounds the bearing support. The pivoting mirror is pivotable about any axis which is perpendicular to the optical axis of the pivoting mirror and which passes through a pivoting centre near the first end of the bearing support. Owing to the presence of the tubular portion of the bearing support inside the part of the rubber compound which is connected to the back of the pivoting mirror, the mirror bearing arrangement is sufficiently rigid for translations perpendicular to the optical axis of the pivoting mirror device. However, this adversely affects the elasticity of the pivoting bearing arrangement in the desired pivoting directions. In view of these conflicting requirements it is important to have a bearing arrangement which has a desired degree of elasticity in the desired pivoting direction or pivoting directions with a minimal volume of rubber-like elastic material. In another known pivoting mirror device the pivoting mirror is only pivotable about a single axis perpendicular to the optical axis of the pivoting mirror and the bearing support has such a shape that an elongate elastic bearing is obtained when the silicone rubber compound is applied. In this bearing arrangement the silicone rubber is located only between the pivoting mirror and the bearing support, so that no parts of the bearing support penetrate into the elastic bearing. As a result of this the elasticity of the pivotal bearing arrangement is great in the desired pivoting direction. However, the resistance to translations perpendicular to the pivoting axis is very small.

It is the object of the invention to provide a pivoting mirror device of the type mentioned in the opening paragraph, comprising a mirror bearing arrangement which has a high elasticity in the desired pivoting directions and which is moreover robust and has a higher resistance to movements of the pivoting mirror in undesired directions. To this end the invention is characterized in that the said portion of the bearing support which is located near the first end has a cross-section which varies from a minimum transverse dimension at the first end to a maximum transverse dimension at a location nearer the second end. Owing to the presence of a part of the bearing support inside the rubber-like material the bearing arrangement will have the desired rigidity. Since the said portion has said cross-section it is achieved that the bearing also has a high elasticity in the desired pivoting direction or pivoting directions. As will be described in more detail hereinafter, it is possible to give the bearing a maximum elasticity for a specific volume of rubber-like material, allowance being made for the permissible load-taking capacity of the rubber-like material.

An embodiment of the invention is characterized in that the rubber-like material surrounds the bearing support over the entire length of said portion of varying cross-section, the bearing support also being surrounded by a layer or rubber-like material at the said location where the cross-section has the maximum transverse dimension. The additional layer of rubber-like material only has a limited influence on the elasticity of the bearing and thus virtually constitutes the protective enclosure for the more inwardly disposed portion of the bearing which is of greater significance for the elastic properties of the bearing arrangement. Owing to the coating environmental influences can only cause slight variations in the properties of the bearing arrangement in the course of time.

A further embodiment of the invention is characterized in that for affixing the elastic material to the bearing support the bearing support has a constricted portion adjoining said portion of varying cross-section. This embodiment is especially of significance from the point of view of manufacturing technology. The presence of the constriction prevents the rubber-like material from being drawn or slid off the bearing support.

An optimum combination of properties of the bearing arrangement with respect to the elasticity in the desired directions and rigidity in the other directions is obtained with an embodiment of the invention which is characterized in that said portion of the bearing support inside the elastic material has the form of a truncated cone.

Figure 2:
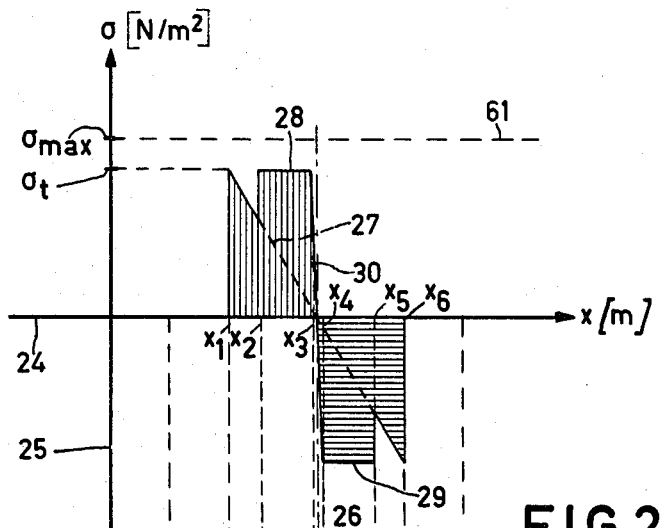
Figure 3:
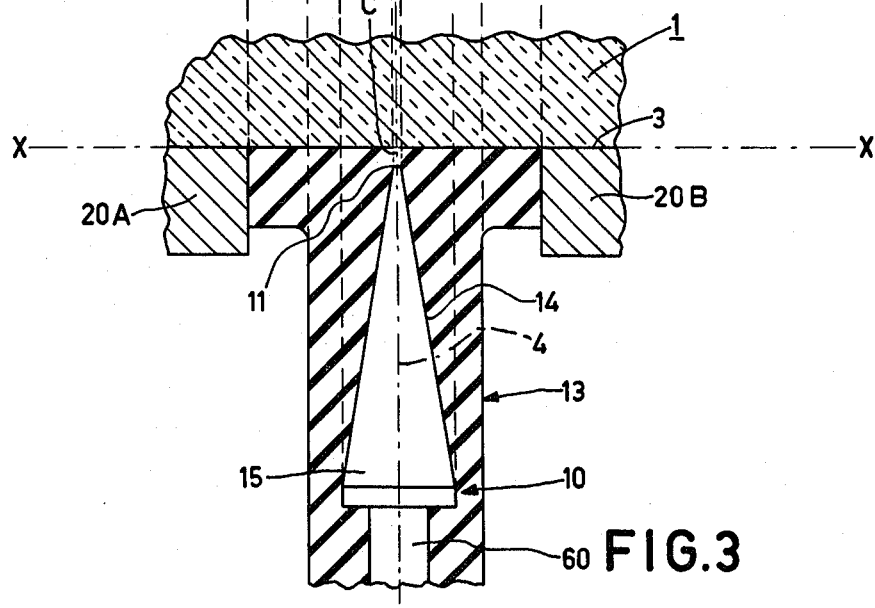
Figure 4:
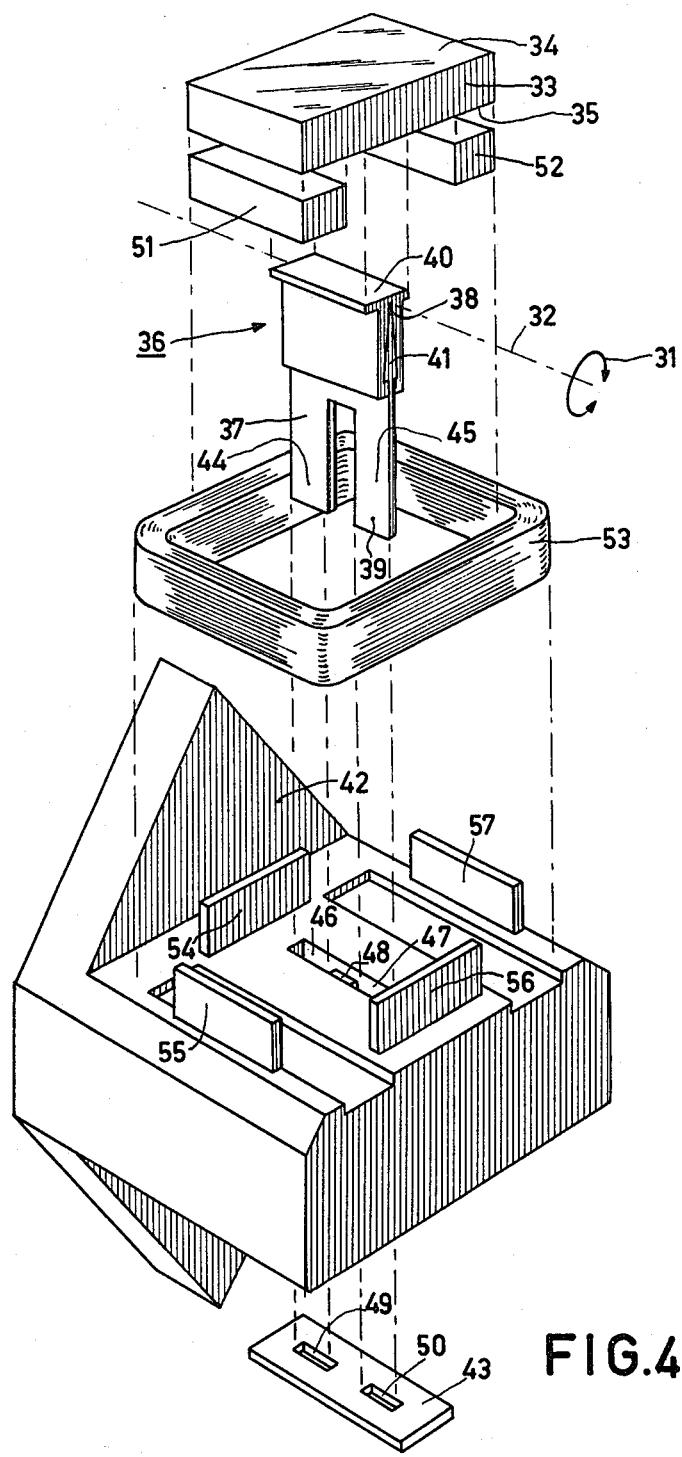

The invention will now be described in more detail with reference to the drawing, in which:

FIG. 1 is a perspective view, partly in cross-section and on an enlarged scale, of a pivoting mirror device in accordance with the invention, suitable for pivotal movements in two directions which are perpendicular to each other, FIG. 2 is a graph of the stress profile in the elastic material of the bearing arrangement of the pivoting mirror device shown in FIG. 1 in the case of the maximum deflection, FIG. 3, on an enlarged scale, shows a sectional view of a part of the bearing arrangement of the pivoting mirror device shown in FIG. 1 in order to clarity the graph of FIG. 2, and FIG. 4 is an exploded view of a pivoting mirror device in accordance with the invention, suitable for pivotal movements about a single pivoting axis.

The pivoting mirror device shown in FIG. 1 is suitable for use in optical video disc players, a light beam produced by a laser being employed for scanning information tracks on a video disc. The device comprises a pivoting mirror 1 with a radiation-reflecting front 2 and, on the reverse side thereof, a back 3. The Figure shows an axis 4, hereinafter referred to as the optical axis of the pivoting mirror. This axis extends perpendicularly to the front 2 of the pivoting mirror if the pivoting mirror is in its neutral position and passes through the centre thereof. The pivoting mirror is pivotable about two pivoting axes 5 and 6 in pivoting directions, which are symbolically represented by two arcuate arrows 7 and 8, and is suitable both for the correction of errors in the track position of the optical disc and for timing error corrections. The axes 5 and 6 pass through a point C on the optical axis 4, which point may be regarded as the pivoting centre of the pivoting mirror. In principle, the pivoting mirror is pivotable about any axis through the centre C perpendicular to the optical axis 4, but the pivotal movements may practically always be regarded as combinations of pivotal movements about the axes 5 and 6.

The pivoting mirror device comprises a mirror bearing arrangement 9, which comprises a rigid bearing support 10. A first end 11 of the bearing support is disposed near the back 3 of the pivoting mirror, whilst the second end 12 is remote from the back of the pivoting mirror. An elastic bearing 13 is connected to the back 3 of the pivoting mirror 1 and to the bearing support 10. Said bearing comprises a rubber-like material, which surrounds the first end of the bearing support 10 and a portion 14 of the bearing support near the first end.

Said portion 14 of the bearing support 10 has a cross-section which varies from a minimum transverse dimension at the first end 11 to a maximum transverse dimension at a location 15 situated nearer the second end 12. (See in particular FIG. 3).

The bearing support 10 is secured in a plastics frame 17 by means of a bolt 16, which frame in its turn is mounted on a metal frame carrier 18. The frame carrier is provided with a threaded stud 19 secured thereto, with the aid of which the pivoting mirror device can be mounted in a video disc player. For controlling the pivotal movements of the pivoting mirror 1, there are provided a plurality of permanent magnets glued against the back 3, two of said magnets 20 and 21 being visible in FIG. 1. The permanent magnets are radially magnetized, so that their magnetic field lines extend parallel to the reflecting surface 2 of the pivoting mirror. In grooves of the frame 17 control coils are arranged, three of said coils referenced 22 to 24 being shown in FIG. 1. The coil 22 cooperates with the permanent magnet 20 for the electrically controllable pivotal movement of the pivoting mirror in a pivoting direction in accordance with the arrow 7. The coil 24 on the other side of the pivoting mirror cooperates with a permanent magnet in a similar way. The coil 23 cooperates with the permanent magnet 21 for the electrically controllable pivotal movement of the pivoting mirror in the pivoting direction in accordance with the arrow 8. On the other side of the pivoting mirror there is arranged a similar coil and a similar permanent magnet for the same purpose.

The favourable properties of the pivoting mirror device shown in FIG. 1 will be discussed more comprehensively with reference to FIGS. 2 and 3. These Figures, in sectional view (and on an enlarged scale), show a part of the pivoting mirror device shown in FIG. 1 near the portion 14 of the bearing support. This portion has a cross-section which varies from a minimum transverse dimension at the first end 11 to a maximum transverse dimension at a location 15 situated nearer the second end 12. Above the part of the pivoting mirror device shown in FIG. 3, FIG. 2 shows two axes 24 and 25 which are perpendicular to each other. The axis 24 intersects the optical axis 4 of the pivoting mirror device perpendicularly. The axis 25 intersects the axis 24 perpendicularly and is parallel to the optical axis 4. The axis 24 will be referred to as the X-axis, whilst the axis 25 will be referred to as the $\sigma$-axis. The $\sigma$-axis relates to tensile and compressive stresses occurring in the elastic material of the elastic bearing and the X-axis to the location of a point in the cross-section X—X (FIG. 3), where the bearing 13 and the back 3 of the pivoting mirror 1 are connected to each other.

As is known, the following approximated relationship is valid for tensile stresses in elastic materials:

$$\sigma = \frac{E \cdot \Delta l}{l} \ [N/m^2]$$

where: $\sigma$ is the stress in Newtons per square meter in a specific point of a cross-section in the elastic material, l is the original length of the elongated body, measured in the direction in which the elongation occurs, in meters, $\Delta l$ is the elongation or, in other words, the change in length, in meters, and E is Young's modulus in Newtons per square meters.

As is apparent from this relationship, the stress in a cross-section depends linearly on the elongation which occurs. In the absence of the bearing support, if the elastic bearing 13 were completely made of an elastic rubber-like material, the stress in the cross-section X—X in the case of tilting in accordance with the arrow 26 would vary in accordance with the line 27 in FIG. 2. However, owing to the presence of the portion 14 of the bearing support in the form of a truncated cone the stress profile from point $X_2$ on the X-axis no longer follows the line 27 but a horizontal line 28 between $X_2$ and $X_3$. As between these two values of X the circumferential surface area of the truncated cone varies linearly from a larger diameter to a smaller diameter, the length of the rubber which is subjected to a tensile stress decreases linearly between $X_2$ and $X_3$. It will be evident that, in view of this linear character of the dependence of the stress in rubber on the elongation which occurs, a constant tensile stress will be obtained over the portion between $X_2$ and $X_3$ owing to the presence of the cone-shaped portion 14. In an identical manner a constant compressive stress will occur between points $X_4$ and $X_5$, so that between these two last-mentioned points the stress profile will exhibit a horizontal portion 29. Since the first end of the portion 14 of the bearing support is truncated, the stress between the points $X_3$ and $X_4$ will vary steeply in accordance with the line 30, which interconnects the lines 28 and 29. FIG. 2 shows a dashed line 61, which indicates the maximum permissible tensile stress in the rubber. The location of the lines 28 and 29 above and below the X-axis respectively is determined by the magnitude of the stress $\sigma_t$ in rubber which is considered to be permissible. As can be seen in FIG. 2, the portions of the stress profile above and below the X-axis have substantially rectangular shapes. The enclosed hatched areas therefore have a substantially maximum surface area. This means that a minimum amount of elastic material is employed by the use of the conical portion 14, starting from a specific desired resistance to pivoting and a specific type of rubber. This means that by approximation an optimum rigidity of the bearing exists in directions other than the desired directions.

The embodiment of FIG. 4 concerns a pivoting mirror devide in accordance with the invention which is suitable for pivoting in accordance with the double-headed arrow 31 about a single pivoting axis 32 only. The device comprises a pivoting mirror 33 with a radiation-reflecting front 34 and a back 35. The mirror bearing 36 comprises a rigid bearing support 37 having a first end 38 situated near the back 35 of the pivoting mirror 33 and an end 39 which is remote therefrom. Furthermore, there is provided an elastic bearing 40 of a rubber-like material, which bearing is connected to the back 35 of the pivoting mirror and to the bearing support 37 and which material surrounds a first end 38 of the bearing support and furthermore a portion 41 of the bearing support near the first end. This portion of the bearing support has a cross-section in the form of a longitudinal section of the truncated cone, that is identical to the cross-section of the portion 14 of the pivotal bearing arrangement in accordance with FIGS. 1 and 3. Therefore, FIGS. 2 and 3 are also illustrative of the properties of the pivotal bearing arrangement 36.

The pivoting mirror device shown in FIG. 4 comprises a frame carrier 42 on which the bearing support 47 is mounted by means of a mounting plate 43. The bearing support has two limbs 44 and 45, which are passed through openings 46 and 47, which are bounded by a portion 48 of the frame carrier 42. The mounting plate 43 has slotted openings 49 and 50 corresponding to the limbs 44 and 45. After the limbs 44 and 45 have been passed through the openings 46, 47 and 49, 50, the ends are slightly twisted so that the limbs can no longer be withdrawn.

At its underside the pivoting mirror 34 carries two rod-shaped permanent magnets 51 and 52. A control coil 53 of substantially rectangular shape is mounted on the frame carrier 42 between the upright members 54 to 57. This guarantees a co-axial alignment of the coil 53 relative to the pivoting mirror 34.

What is claimed is:

1. A pivoting mirror device for an apparatus which scans information tracks on an information carrier with the aid of a radiation beam, which device comprises:
    a pivoting mirror (1) which is pivotable about at least one pivoting axis (5, 6) and which has a radiation-reflecting front (2) and, on the reverse side thereof, a back (3), and
    a mirror bearing arrangement (9) comprising:
        a rigid bearing support (10) having a first end (11) situated near the back (3) of the pivoting mirror and a second end (12) which is remote therefrom, and
        an elastic bearing (13) of a rubber-like material which is connected both to the back (3) of the pivoting mirror (1) and to the bearing support (10), which material surrounds the first end of the bearing support and a portion (14) of the bearing support near the first end,
    characterized in that said portion (14) of the bearing support (10) which is situated near the first end (11) has a cross-section which varies from a minimum transverse dimension at the first end (11) to a maximum transverse dimension at a location situated nearer the second end (15).

2. A pivoting mirror device as claimed in claim 1, characterized in that the rubber-like material surrounds the bearing support (10) over the entire length of said portion (14) of varying cross-section, the bearing support also being surrounded by a layer of a rubber-like material at the said location (15) where the cross-section has the maximum transverse dimension.

3. A pivoting mirror device as claimed in claim 2, characterized in that for affixing the elastic material to the bearing support (10), the bearing support has a constricted portion (60) adjoining said portion of varying cross-section.

4. A pivoting mirror device as claimed in claims 1, 2, or 3, characterized in that said cross-section has the form of a longitudinal section of a truncated cone.

* * * * *